(12) United States Patent
Zhang et al.

(10) Patent No.: US 11,748,419 B2
(45) Date of Patent: *Sep. 5, 2023

(54) GENERATING AND EXECUTING AN OPTIMAL DIALOGUE STRATEGY

(71) Applicant: International Business Machines Corporation, Armonk, NY (US)

(72) Inventors: Yunfeng Zhang, Tarrytown, NY (US);
Vera Liao, White Plains, NY (US);
Biplav Srivastava, Rye, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,150

(22) Filed: Aug. 17, 2021

(65) Prior Publication Data
US 2021/0374181 A1  Dec. 2, 2021

Related U.S. Application Data

(63) Continuation of application No. 16/192,204, filed on Nov. 15, 2018, now Pat. No. 11,138,272.

(51) Int. Cl.
*G06F 16/00* (2019.01)
*G06F 16/907* (2019.01)
(Continued)

(52) U.S. Cl.
CPC ........ *G06F 16/907* (2019.01); *G06F 16/3329* (2019.01); *G06F 16/90332* (2019.01); *G06N 20/00* (2019.01); *H04L 67/10* (2013.01)

(58) Field of Classification Search
CPC ............ G06F 16/90332; G06F 16/907; G06F 16/3329; G06N 20/00; G06N 5/041;
(Continued)

(56) References Cited

U.S. PATENT DOCUMENTS 4,974,191 A * 11/1990 Amirghodsi .......... G06F 40/284
704/8
6,542,583 B1   4/2003 Taylor
(Continued)

FOREIGN PATENT DOCUMENTS

CN   105378708 A   3/2016
CN   105378731 A   3/2016

OTHER PUBLICATIONS

U.S. Appl. No. 16/192,204, filed Nov. 15, 2018.
(Continued)

*Primary Examiner* — Vincent F Boccio
(74) *Attorney, Agent, or Firm* — Amin, Turocy & Watson, LLP

(57) ABSTRACT

Techniques that facilitate generating and executing an optimal dialogue strategy are provided. In one example, a system includes an information gain component and a question selector component. The information gain component estimates information gain data associated with first dialogue data of an information system. The information gain data is indicative of an amount of change in entropy associated with the first dialogue data. The question selector component selects between second dialogue data associated with a first question strategy and third dialogue data associated with a second question strategy based on the information gain data.

20 Claims, 10 Drawing Sheets

(51) Int. Cl.
*G06N 20/00* (2019.01)
*G06F 16/332* (2019.01)
*G06F 16/9032* (2019.01)
*H04L 67/10* (2022.01)

(58) Field of Classification Search
CPC .......... G06N 5/003; G06N 3/08; G06N 20/20; G06N 7/005; G06N 20/10; H04L 67/10
USPC ........................................................ 707/769
See application file for complete search history.

(56) References Cited

U.S. PATENT DOCUMENTS

| | | | |
|---|---|---|---|
| 6,829,603 | B1 | 12/2004 | Chai et al. |
| 7,734,471 | B2 | 6/2010 | Paek et al. |
| 10,140,883 | B2 | 11/2018 | Wong et al. |
| 11,138,272 | B2 * | 10/2021 | Zhang ............... G06F 16/90332 |
| 2003/0220793 | A1 | 11/2003 | Kosaka et al. |
| 2005/0075878 | A1 | 4/2005 | Balchandran et al. |
| 2005/0131677 | A1 | 6/2005 | Assadollahi |
| 2009/0070311 | A1 | 3/2009 | Feng |
| 2010/0091954 | A1 | 4/2010 | Dayanidhi et al. |
| 2016/0314784 | A1 | 10/2016 | Kleppe et al. |
| 2017/0200077 | A1 * | 7/2017 | Weston ................ G06N 3/0445 |
| 2017/0316777 | A1 | 11/2017 | Perez et al. |
| 2018/0114169 | A1 | 4/2018 | Wiig et al. |

OTHER PUBLICATIONS

Non Final office action received for U.S. Appl. No. 16/192,204 dated Jun. 1, 2020, 22 Pages.

Final office action received for U.S. Appl. No. 16/192,204 dated Nov. 3, 2020, 19 Pages.

Horvitz, et al., "A Computational Architecture for Conversation," 1999, in UM99 User Modeling Springer, pp. 201-210.

Brennan, "Conversation as direct manipulation: An iconoclastic view," 1990, 20 pages.

Komatani, et al., "Efficient Dialogue Strategy to Find Users' Intended Items from Information Query Results," in Proceedings of the 19th international conference on Computational linguistics, vol. 1. Association for Computational cinguistics, Morristown, NJ, USA, pp. 1-7.

Ghazali, "A competence based education and training (CBET) approach to the diploma in accounting programme in the polytechnics of malaysia: an investigation and evaluation," Diss. University of Huddersfield, 2004, 277 pages.

Gervasio et al., "Learning to Ask the Right Questions to Help a Learner Learn," in Proceedings of the 16th International conference on Intelligent user interfaces (pp. 135-144). ACM.

Chu-Carroll, "MIMIC: An Adaptive Mixed Initiative Spoken Dialogue System for Information Queries," 2000, Association for Computational Linguistics, pp. 97-104.

Newman, et al., "Knowledge, Opinion, and the News: The Calculus of Political Learning," Paper presented at the Annual Meeting of the American Political Science Association (Washington.DC, Sep. 1-4, 1988), 33 pages.

Radlinski, et al., "A theoretical framework for conversational search." Proceedings of the 2017 Conference on conference Human Information Interaction and Retrieval. ACM, 2017, 10 pages.

Stoyanchev, "Impact of responsive and directive adaptation on local dialog processing," Diss. The Graduate School, Stony Brook University: Stony Brook, NY., 2011, 185 pages.

Mell, et al., "The NIST Definition of Cloud Computing," NIST Special Publication 800-145, Sep. 2011, 7 pages.

Zhang et al., "Towards an Optimal Dialog Strategy for Information Retrieval Using Both Open- and Close-ended Questions." 23rd International Conference on Intelligent User Interfaces. ACM, 2018, 5 pages.

Non Final office action received for U.S. Appl. No. 16/192,204 dated Feb. 19, 2021, 19 Pages.

Lit of IBM Patent Applications Treated as Related.

CN Office Action for CN Application No. 201911115453.8 dated Mar. 24, 2023.

Office Action for CN Application No. 201911115453.8 dated Jul. 8, 2023.

* cited by examiner

GENERATING AND EXECUTING AN OPTIMAL DIALOGUE STRATEGY

BACKGROUND

The subject disclosure relates to computer dialogue management systems, and more specifically, to cognitive interaction and/or contextual dialogue between a user and a machine.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that provide for generating and executing an optimal dialogue strategy are described.

According to an embodiment, a system can comprise an information gain and a question selector component. The information gain component can estimate information gain data associated with first dialogue data of an information system. The information gain data can be indicative of an amount of change in entropy associated with the first dialogue data. The question selector component can select between second dialogue data associated with a first question strategy and third dialogue data associated with a second question strategy based on the information gain data.

According to another embodiment, a computer-implemented method is provided. The computer-implemented method can comprise estimating, by a system operatively coupled to a processor, information gain data indicative of an amount of change in entropy related to first dialogue data associated with an information system. The computer-implemented method can also comprise selecting, by the system, between second dialogue data associated with a first question strategy and third dialogue data associated with a second question strategy based on the information gain data.

According to yet another embodiment, a computer program product facilitating generating and executing an optimal dialogue strategy can comprise a computer readable storage medium having program instructions embodied therewith. The program instructions can be executable by a processor and cause the processor to estimate, by the processor, information gain data indicative of an amount of change in entropy related to first dialogue data associated with an information system. The program instructions can also cause the processor to select, by the processor, between second dialogue data associated with a first question strategy and third dialogue data associated with a second question strategy based on the information gain data.

DETAILED DESCRIPTION

Figure 1:
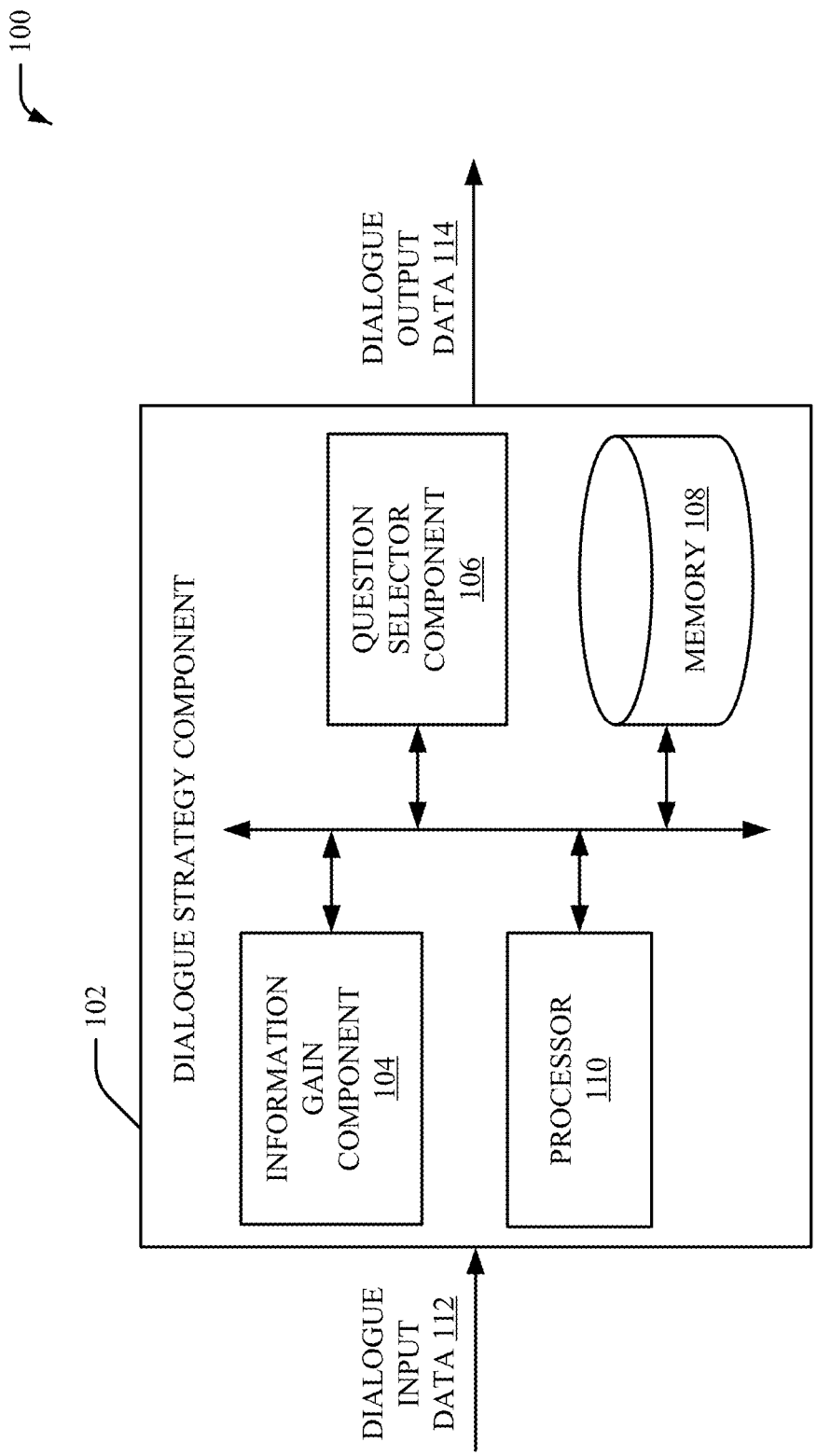
FIG. 1 illustrates a block diagram of an example, non-limiting system that includes a dialogue strategy component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In this regard, an information query system can employ a set of close-ended questions such as, for example, a decision tree, to perform learning associated with a search target of a user. For example, the information query system can be a dialogue computer system that converses with a user based on textual data, speech data, graphics data and/or other data to facilitate communication. Generally, a dialogue computer system employs semantic information to manage flow of a conversation. However, when there is a myriad of documents and/or items to search, solely relying on close-ended questions can lead to long and/or undesirable dialogues.

Embodiments described herein include systems, computer-implemented methods, and computer program products that provide for generating and executing an optimal dialogue strategy. For instance, an adaptive dialogue strategy framework that incorporates open-ended questions at an optimal timing can be employed to reduce a length of dialogues associated with an information system such as, for example, an information query system, a dialogue computer system, etc. In an aspect, information gain of open-ended questions can be estimated. Furthermore, at a dialogue step, the information gain can be compared with close-ended questions to a determine a particular question strategy to present to a user device. In an embodiment, a user can describe, via a user device, item features in a natural language. The item features can be extracted, for example, by a natural language processing system. As such, the item features can be binary (e.g., either identified or not identified) and the item features can comprise multiple values by converting the item features into multiple binary features. For example, a feature "visual option" can be converted into two or more binary features that describe individual names of visual options such as, for example, red, green, blue, etc. In another embodiment, a question selector can optimally select between asking a close-ended question to inquire about a value of a specific feature and asking an open-ended question for which a user provides multiple features. The question selector can select between the close-ended question and the open-ended question by maximizing an expected information gain. For instance, the information gain can be employed for close-ended questions and/or open-ended questions. Information gain can be indicative of an amount of change in entropy associated with a close-ended question and/or an open-ended question. In one example, at a dialogue step, the question selector can provide an open-ended question to a user device in response to a determination that an estimated information gain satisfies a defined criterion. For instance, the question selector can provide an open-ended question to a user device in response to a determination that an estimated information gain for an open-ended question is larger than information gain of one or more close-ended questions associated with a specific feature. As such, performance and/or accuracy of a dialogue strategy system can be improved. Moreover, a length of a dialogue provided by a dialogue strategy system can be reduced.

FIG. 1 illustrates a block diagram of an example, non-limiting system 100 that provide for generating and executing an optimal dialogue strategy in accordance with one or more embodiments described herein. In various embodiments, the system 100 can be a system associated with technologies such as, but not limited to, computer technologies, server technologies, server/client technologies, dialogue strategy technologies, information technologies, information query technologies, dialogue computer technologies, natural language processing technologies, cloud computing technologies, machine learning technologies, artificial intelligence technologies, digital technologies, data processing technologies, data analysis technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a dialogue strategy component, etc.) for carrying out defined tasks related to generating and/or executing a dialogue strategy. The system 100 and/or components of the system can be employed to solve new problems that arise through advancements in technologies mentioned above, and/or computer architecture, and the like. One or more embodiments of the system 100 can provide technical improvements to computer systems, server systems, server/client systems, dialogue strategy systems, information systems, information query systems, dialogue computer systems, natural language processing systems, cloud computing systems, machine learning systems, artificial intelligence systems, digital systems, data processing systems, data analysis systems, and/or other computer systems. One or more embodiments of the system 100 can also provide technical improvements to a processing unit (e.g., a processor) associated with a dialogue strategy process by improving processing performance of the processing unit, improving processing efficiency of the processing unit, and/or reducing an amount of time for the processing unit to perform a dialogue strategy process. One or more embodiments of the system 100 can also provide technical improvements to a server/client computing environment (e.g., a server/client computing platform) by improving processing performance of the server/client computing environment and/or improving processing efficiency of the server/client computing environment. In one example, the system 100 can be associated with a dialogue strategy process.

In the embodiment shown in FIG. 1, the system 100 can include a dialogue strategy component 102. As shown in FIG. 1, the dialogue strategy component 102 can include an information gain component 104 and a question selector component 106. Aspects of the dialogue strategy component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the dialogue strategy component 102 can also include memory 108 that stores computer executable components and instructions. Furthermore, the dialogue strategy component 102 can include a processor 110 to facilitate execution of the instructions (e.g., computer executable components and corresponding instructions) by the dialogue strategy component 102. As shown, the information gain component 104, the question selector component 106, the memory 108 and/or the processor 110 can be electrically and/or communicatively coupled to one another in one or more embodiments.

The dialogue strategy component 102 (e.g., the information gain component 104 of the dialogue strategy component 102) can receive dialogue input data 112. The dialogue input data 112 can be generated by and/or provided by an electronic device. The electronic device can be a user device such as, for example, a computing device, a computer, a desktop computer, a laptop computer, a monitor device, a smart device, a smart phone, a mobile device, a handheld device, a tablet, a wearable device, a portable computing device, a sensor device, a microphone device, and/or or another electronic device. Furthermore, the dialogue input data 112 can include speech data, textual data, audio data, video data, image data and/or other data. In an embodiment, the dialogue input data 112 can be raw data. In another embodiment, at least a portion of the dialogue input data 112 can be encoded data and/or processed data. In an aspect, the dialogue input data 112 can be dialogue data of an information system. For example, the dialogue input data 112 can be dialogue data of an information query system associated with the electronic device, a dialogue computer system associated with the electronic device, another information system associated with the electronic device, etc. In a non-limiting example, the information system can be a computer program system that employs one or more artificial intelligence techniques to conducts a dialogue with a user via speech data, textual data, audio data, video data, image data and/or other data. The electronic device can, for example, be in communication with the information system. Furthermore, the dialogue strategy component 102 can be associated with the information system. For instance, the electronic device can provide the dialogue input data 112 to the information system that includes the dialogue strategy component 102.

The information gain component 104 can estimate information gain data associated with the dialogue input data 112. The information gain data can be indicative of an amount of change in entropy associated with the dialogue input data 112. In one example, the information gain data can be a Kullback-Leibler divergence value associated with a probability distribution for the dialogue input data 112. The question selector component 106 can select a question strategy from a set of question strategies based on the information gain data. For instance, the question selector component 106 can select dialogue data associated with a question strategy from a set of question strategies associated with different dialogue data. In an example, the dialogue input data 112 can be first dialogue data and the question selector component 106 can select between at least second dialogue data associated with a first question strategy and third dialogue data associated with a second question strategy based on the information gain data. A question strategy can be, for example, a query strategy for a dialogue provided by the information system associated with M items and N systems, where M is an integer and N is an integer. In an embodiment, the question selector component 106 can select between one or more open-ended questions and one or more close-ended questions based on the information gain data. For example, in an embodiment, the first question strategy can include one or more open-ended questions and the second question strategy can include one or more close-ended questions. In another embodiment, the first question strategy can include one or more close-ended questions and the second question strategy can include one or more open-ended questions. An open-ended question can be, for example, a question provided by the information system where a user can provide any feature for dialogue data. For instance, in a non-limiting example, an open-ended question can be a question such as "What visual option do you want for your electronic device?". A close-ended question can be, for example, a question provided by the information system where a user can respond to an asked feature for dialogue data. For instance, in a non-limiting example, a close-ended question can be a question such as "Do you want your electronic device to be silver?". As such, the close-ended question can be associated with a binary response and the open-ended question can be associated with a non-binary response. In an aspect, the question selector component 106 can generate dialogue output data 114. The dialogue output data 114 can include the question strategy selected by the question selector component 106 based on the information gain data. For example, the dialogue output data 114 can include the second dialogue data associated with the first question strategy or the third dialogue data associated with the second question strategy selected by the question selector component 106 based on the information gain data. In certain embodiments, the dialogue output data 114 can be presented, for example, on an electronic device. The electronic device can be a user device such as, for example, a computing device, a computer, a desktop computer, a laptop computer, a monitor device, a smart device, a smart phone, a mobile device, a handheld device, a tablet, a wearable device, a portable computing device, a sensor device, a microphone device, and/or or another electronic device. For example, the question selector component 106 can present speech data, textual data, audio data, video data, image data and/or other data associated with the dialogue output data 114 on the electronic device. In certain embodiments, the electronic device that receives the dialogue output data 114 can correspond to an electronic device that provides the dialogue input data 112. Alternatively, the electronic device that receives the dialogue output data 114 can be a different electronic device than an electronic device that provides the dialogue input data 112. In certain embodiments, the question selector component 106 can select a question strategy from a set of question strategies based on an estimated interaction cost between the information system and an electronic device. For instance, the question selector component 106 can select between the second dialogue data associated with the first question strategy and the third dialogue data associated with the second question strategy based on an estimated interaction cost between the information system and an electronic device. The electronic device can be an electronic device that receives the dialogue output data 114. In one example, the estimated interaction cost can be an estimated cost of a user (e.g., an electronic device employed by a user) to answer a question associated with the dialogue output data 114.

In an embodiment, the information gain component 104 can estimate a number of features associated with the dialogue input data 112. The number of features can be provided by one or more users. In certain embodiments, the information gain component 104 can estimate a number of features associated with the dialogue input data 112 based on historical data. For example, the information gain component 104 can estimate a number of features associated with the dialogue input data 112 based on historical user responses associated with one or more previously generated question strategies. Furthermore, the information gain component 104 can calculate the information gain data for question strategies for the one or more users. For an open-ended question, the information gain component 104 can, for example, determine an average information gain across the features. In certain embodiments, for an open-ended question, the information gain component 104 can partition a feature space associated with the dialogue input data 112 and/or other dialogue data based on correlation analysis and/or historical data to determine an average information gain across the features. For a close-ended question, the information gain component 104 can, for example, determine one or more information gains for one or more features from the features. Furthermore, the information gain component 104 can query a dialogue provided by the information system using the one or more information gains for the one or more features. In another embodiment, the information gain component 104 can scale the information gain data based on accuracy of natural language processing associated with the dialogue input data 112. For example, the information gain component 104 can scale the information gain data based on estimated accuracy of detected dialogue associated with the dialogue input data 112 using natural language processing. In yet another embodiment, question selector component 106 can select a question strategy from a set of question strategies based on the number of features associated with the dialogue input data 112. For example, the question selector component 106 can select between the second dialogue data associated with the first question strategy and the third dialogue data associated with the second question strategy based on the number of features associated with the dialogue input data 112 (e.g., the first dialogue data).

It is to be appreciated that the dialogue strategy component 102 (e.g., the information gain component 104 and/or the question selector component 106) performs a dialogue strategy process that cannot be performed by a human (e.g., is greater than the capability of a single human mind). For example, an amount of data processed, a speed of processing of data and/or data types processed by the dialogue strategy component 102 (e.g., the information gain component 104 and/or the question selector component 106) over a certain period of time can be greater, faster and different than an amount, speed and data type that can be processed by a single human mind over the same period of time. The dialogue strategy component 102 (e.g., the information gain component 104 and/or the question selector component 106) can also be fully operational towards performing one or more other functions (e.g., fully powered on, fully executed, etc.) while also performing the above-referenced dialogue strategy process. Moreover, the dialogue strategy component 102 (e.g., the information gain component 104 and/or the question selector component 106) can include information that is impossible to obtain manually by a user. For example, a type of information included in the dialogue output data 114, an amount of information included in the dialogue output data 114 and/or a variety of information included in the dialogue output data 114 can be more complex than information obtained manually by a user.

Figure 2:
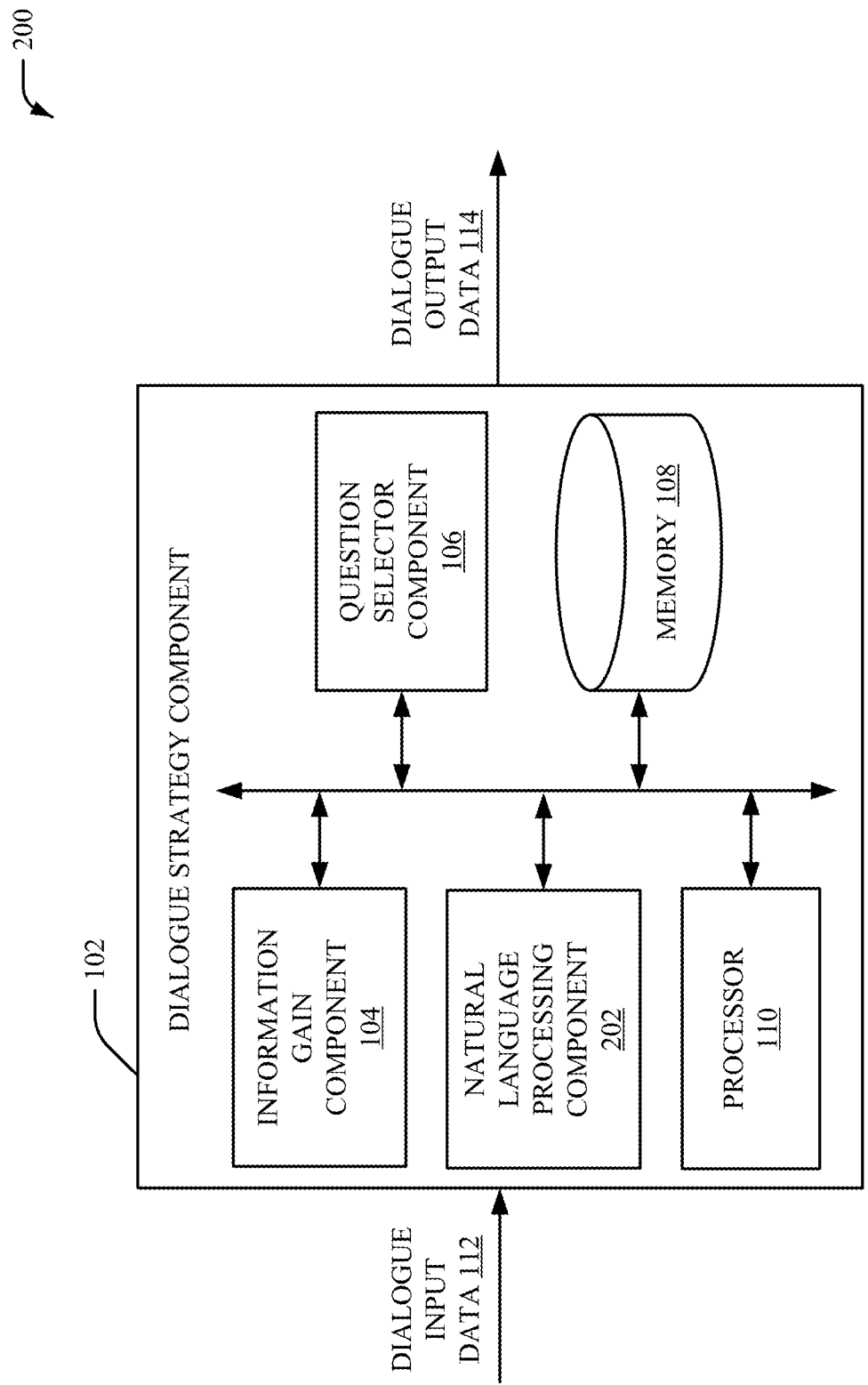
FIG. 2 illustrates a block diagram of another example, non-limiting system that includes a dialogue strategy component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the dialogue strategy component 102. The dialogue strategy component 102 can include the information gain component 104, the question selector component 106 and/or a natural language processing component 202. The natural language processing component 202 can extract the dialogue input data 112 from the information system via natural language processing. For example, the electronic device can provide the dialogue input data 112 to the information system. Furthermore, the natural language processing component 202 can process and/or analyze the dialogue input data 112 via one or more natural language processing techniques. For example, the one or more natural language processing techniques can include speech recognition and/or natural language understanding to interpret content of the dialogue input data 112. In an embodiment, the natural language processing component 202 can generate accuracy data that estimates accuracy of the natural language processing performed by the natural language processing component 202. For example, the natural language processing component 202 can generate accuracy data that estimates accuracy of the natural language processing associated with the dialogue input data 112. Furthermore, the information gain component 104 can modify the information gain data based on the accuracy data that estimates accuracy of the natural language processing. For example, the information gain component 104 can scale the information gain data based on the accuracy data that estimates accuracy of the natural language processing. In certain embodiments, the natural language processing component 202 generate speech data associated with the dialogue output data 114. For example, the natural language processing component 202 can perform natural language processing to generate speech data associated with the dialogue output data 114. Additionally or alternatively, the natural language processing component 202 can present speech data associated with the dialogue output data 114 on an electronic device.

In another embodiment, the natural language processing component 202 can determine classifications, correlations, inferences and/or expressions associated with the dialogue input data 112 based on principles of artificial intelligence and/or one or more machine learning techniques. For instance, the natural language processing component 202 can employ machine learning and/or principles of artificial intelligence (e.g., a machine learning process) to learn one or more features and/or information related to the dialogue input data 112. The natural language processing component 202 can perform learning with respect to learning one or more features and/or information related to the dialogue input data 112 explicitly or implicitly. In an aspect, the natural language processing component 202 can learn one or more features and/or information related to the dialogue input data 112 based on classifications, correlations, inferences and/or expressions associated with principles of artificial intelligence. For instance, the natural language processing component 202 can employ an automatic classification system and/or an automatic classification process to learn one or more features and/or information related to the dialogue input data 112. In one example, the natural language processing component 202 can employ a probabilistic and/or statistical-based analysis (e.g., factoring into the analysis utilities and costs) to learn and/or generate inferences with respect to the dialogue input data 112. In an aspect, the natural language processing component 202 can include an inference component (not shown) that can further enhance automated aspects of the natural language processing component 202 utilizing in part inference-based schemes to learn one or more features and/or information related to the dialogue input data 112.

The natural language processing component 202 can employ any suitable machine-learning based techniques, statistical-based techniques and/or probabilistic-based techniques. For example, the natural language processing component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the natural language processing component 202 can perform a set of machine learning computations associated with learning one or more features and/or information related to the dialogue input data 112. For example, the natural language processing component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to the dialogue input data 112.

Figure 3:
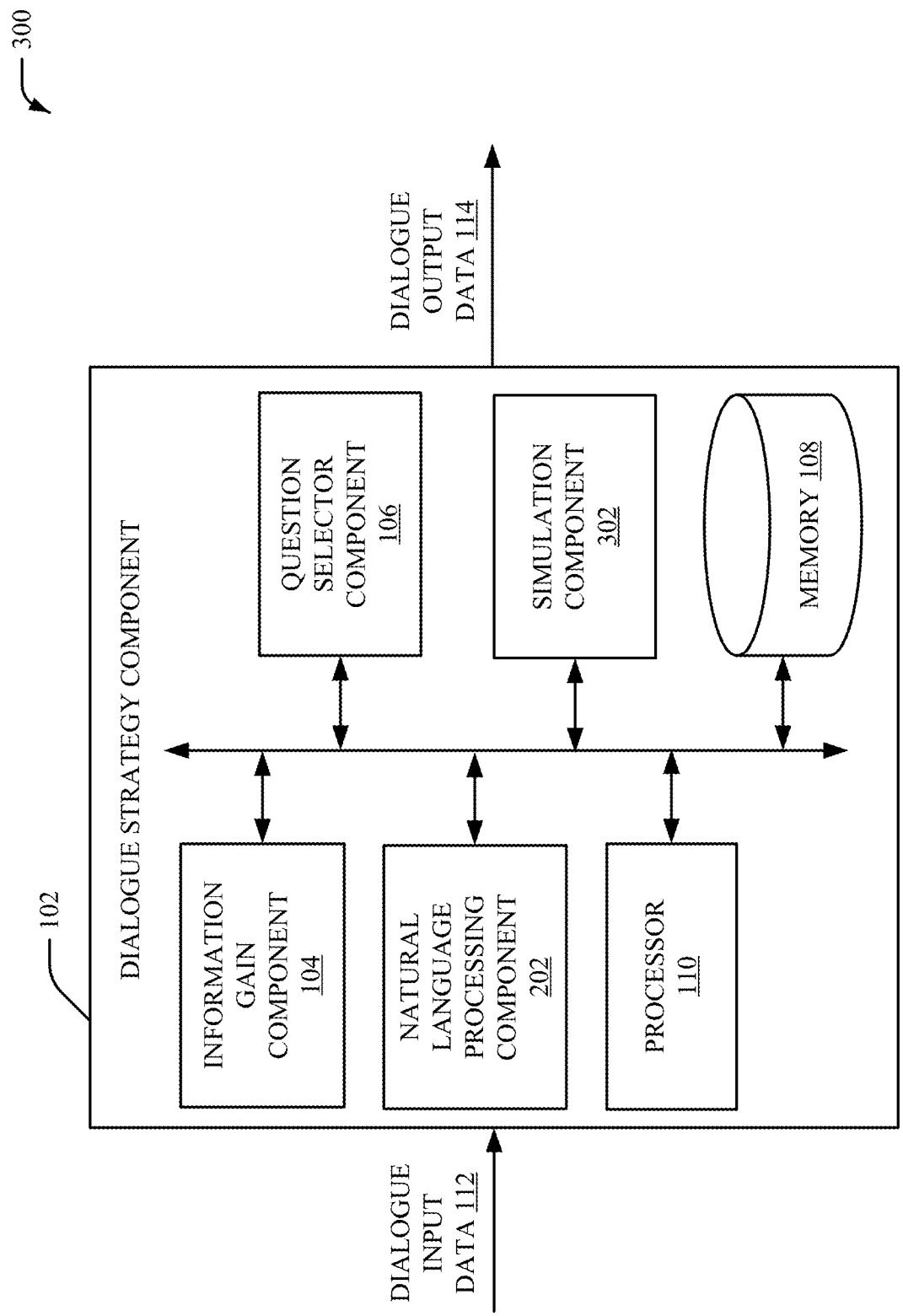
FIG. 3 illustrates a block diagram of yet another example, non-limiting system that includes a dialogue strategy component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the dialogue strategy component 102. The dialogue strategy component 102 can include the information gain component 104, the question selector component 106, the natural language processing component 202 and/or a simulation component 302. The simulation component 302 can generate simulation data that estimates performance of the information system based on a set of model parameters for the information system. For example, the simulation component 302 can generate simulation data that estimates performance of the information system based on a set of model parameters associated with a Poisson distribution of feature values. In an embodiment, the simulation component 302 can generate simulation data that estimates performance of the information system based on different settings for the information system. In another embodiment, the simulation component 302 can generate simulation data that estimates performance of the information system based on a feature correlation matrix for the information system. In an aspect, the information gain component 104 can modify the information gain data based on the simulation data that estimates performance of the information system. For example, the information gain component 104 can scale the information gain data based on the simulation data that estimates performance of the information system. In certain embodiments, the simulation component 302 can simulate a user answering one or more questions associated with a set of question strategies. For example, the simulation component 302 can be a simulator that answers one or more questions associated with a set of question strategies to estimate performance of the information system.

In yet another embodiment, the simulation component 302 can determine classifications, correlations, inferences and/or expressions associated with performance of the information system based on principles of artificial intelligence and/or one or more machine learning techniques. For instance, the simulation component 302 can employ machine learning and/or principles of artificial intelligence (e.g., a machine learning process) to learn one or more features and/or information related to performance of the information system. The simulation component 302 can perform learning with respect to learning one or more features and/or information related to performance of the information system explicitly or implicitly. In an aspect, the simulation component 302 can learn one or more features and/or information related to performance of the information system based on classifications, correlations, inferences and/or expressions associated with principles of artificial intelligence. For instance, the simulation component 302 can employ an automatic classification system and/or an automatic classification process to learn one or more features and/or information related to performance of the information system. In one example, the simulation component 302 can employ a probabilistic and/or statistical-based analysis (e.g., factoring into the analysis utilities and costs) to learn and/or generate inferences with respect to performance of the information system. In an aspect, the simulation component 302 can include an inference component (not shown) that can further enhance automated aspects of the simulation component 302 utilizing in part inference-based schemes to learn one or more features and/or information related to performance of the information system.

The simulation component 302 can employ any suitable machine-learning based techniques, statistical-based techniques and/or probabilistic-based techniques. For example, the simulation component 302 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the simulation component 302 can perform a set of machine learning computations associated with learning one or more features and/or information related to performance of the information system. For example, the simulation component 302 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to performance of the information system.

Figure 4:
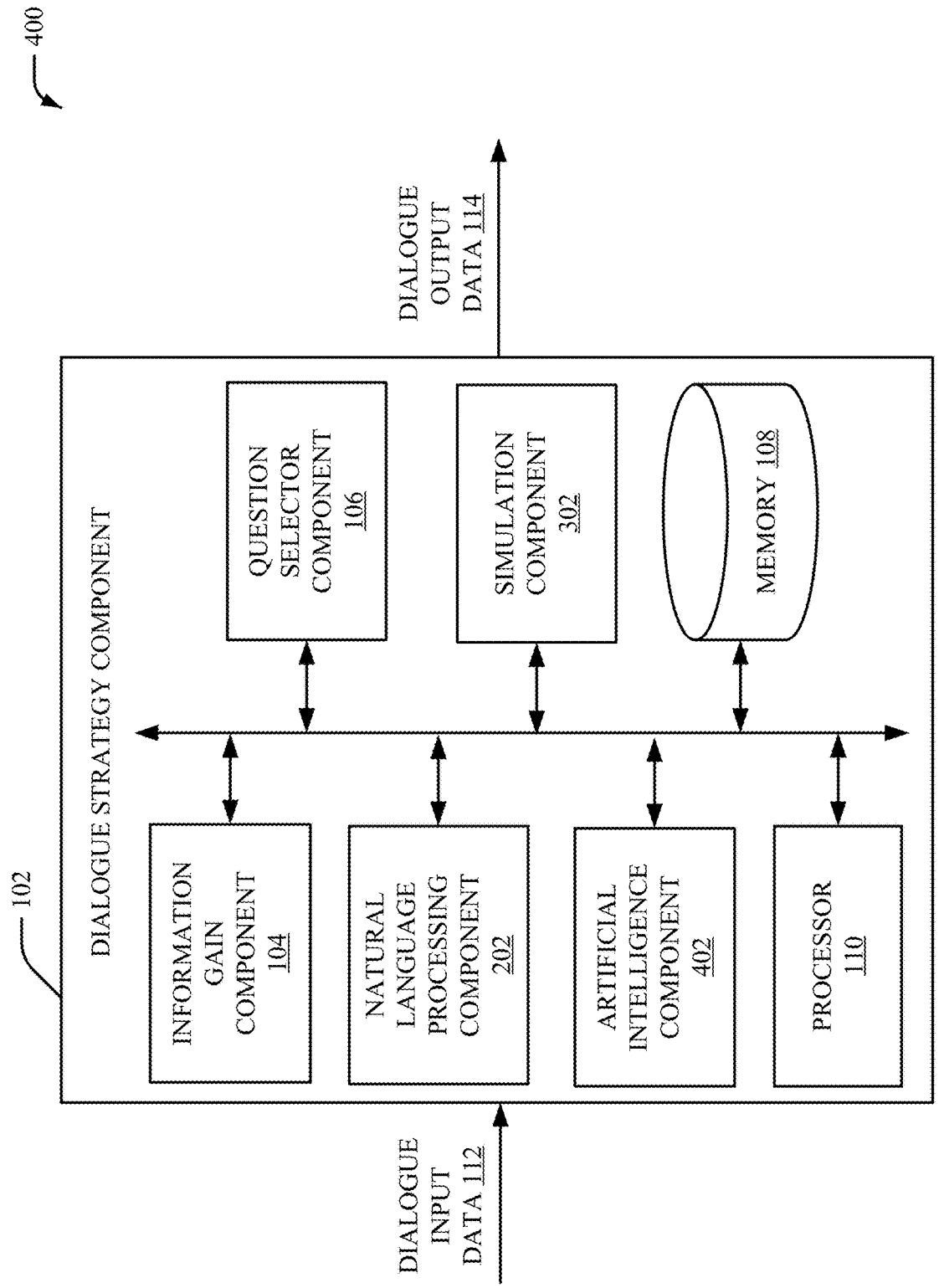
FIG. 4 illustrates a block diagram of yet another example, non-limiting system that includes a dialogue strategy component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the dialogue strategy component 102. The dialogue strategy component 102 can include the information gain component 104, the question selector component 106, the natural language processing component 202, the simulation component 302 and/or an artificial intelligence component 402. The artificial intelligence component 402 can generate at least a portion of a question strategy based on one or more artificial intelligence techniques. For example, the artificial intelligence component 402 can generate at least one question strategy from the set of question strategies based on one or more artificial intelligence techniques. In one example, the artificial intelligence component 402 can generate at least a portion of the first question strategy and/or the second question strategy based on one or more artificial intelligence techniques. In an aspect, the artificial intelligence component 402 can generate at least a portion of dialogue data for a question strategy based on one or more artificial intelligence techniques. For instance, the artificial intelligence component 402 can generate at least a portion of speech data, textual data, audio data, video data, image data and/or other data for a question strategy based on one or more artificial intelligence techniques.

In an embodiment, the artificial intelligence component 402 can generate at least a portion of a question strategy based on principles of artificial intelligence and/or one or more machine learning techniques. For instance, the artificial intelligence component 402 can employ machine learning and/or principles of artificial intelligence (e.g., a machine learning process) to generate at least a portion of a question strategy. The artificial intelligence component 402 can perform learning with respect to generating at least a portion of a question strategy. In an aspect, the artificial intelligence component 402 can generate at least a portion of a question strategy based on classifications, correlations, inferences and/or expressions associated with principles of artificial intelligence. For instance, the artificial intelligence component 402 can employ an automatic classification system and/or an automatic classification process to generate at least a portion of a question strategy. In one example, the artificial intelligence component 402 can employ a probabilistic and/or statistical-based analysis (e.g., factoring into the analysis utilities and costs) to generate at least a portion of a question strategy. In an aspect, the artificial intelligence component 402 can include an inference component (not shown) that can further enhance automated aspects of the artificial intelligence component 402 utilizing in part inference-based schemes to generate at least a portion of a question strategy.

The artificial intelligence component 402 can employ any suitable machine-learning based techniques, statistical-based techniques and/or probabilistic-based techniques. For example, the artificial intelligence component 402 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 402 can perform a set of machine learning computations associated with generating at least a portion of a question strategy. For example, the artificial intelligence component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate at least a portion of a question strategy.

Figure 5:
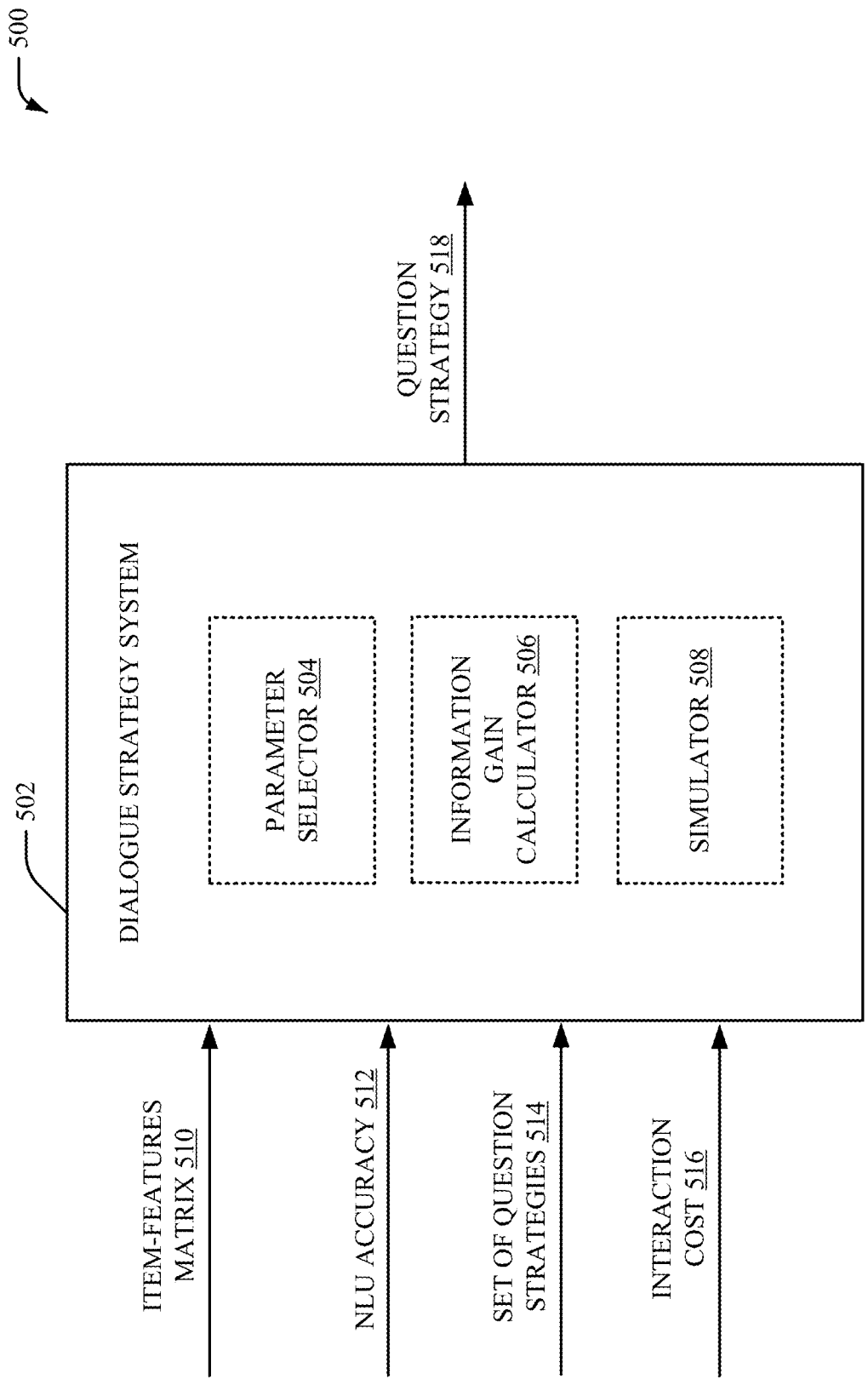
FIG. 5 illustrates an example, non-limiting system associated with a dialogue strategy system in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a dialogue strategy system 502. The dialogue strategy system 502 can be, for example, a dialogue strategy system for an information system. The dialogue strategy system 502 can include a parameter selector 504, an information gain calculator 506 and/or a simulator 508. Furthermore, the dialogue strategy system 502 can employ an item-features matrix 510, NLU accuracy 512, a set of question strategies 514 and/or interaction cost 516. Based on the item-features matrix 510, the NLU accuracy 512, the set of question strategies 514 and/or the interaction cost 516, the dialogue strategy system 502 can provide a question strategy 518. In an embodiment, the dialogue strategy system 502 can be employed by the dialogue strategy component 102. The item-features matrix 510 can be a matrix associated with items and/or features. For instance, the item-features matrix 510 can include digital data associated with items and/or features that is formatted as a matrix of digital data. Data elements of the item-features matrix 510 can be formatted as binary data. For example, the items-features matrix 510 can be an m×n matrix of m items and n features, where m and n are integers. The NLU accuracy 512 can be accuracy data indicative of an accuracy of natural language processing such as, for example, natural language understanding. For example, the NLU accuracy 512 can include a number of features accurately obtained by natural language processing. The set of question strategies 514 can be a set of open-ended questions and/or a set of close-ended questions. For instance, the set of question strategies 514 can be a set potential questions that can be provided by the dialogue strategy system 502 to a user (e.g., an electronic device employed by a user). In one example, the set of question strategies 514 can be a potential dialogue provided by the dialogue strategy system 502 to a user (e.g., an electronic device employed by a user). The interaction cost 516 can be an estimated interaction cost between the dialogue strategy system 502 and a user (e.g., an electronic device employed by a user). For example, the interaction cost 516 can be an estimated cost of a user (e.g., an electronic device employed by a user) to answer a question. The parameter selector 504 can select one or more parameters of the dialogue strategy system 502. In one example, the one or parameters can be one or more model parameters of the dialogue strategy system 502. In an aspect, the simulator 508 can employ the one or more parameters to estimate performance of the dialogue strategy system 502 and/or an information system associated with the dialogue strategy system 502. In an embodiment, the simulator 508 can simulate a user answering one or more questions associated with the set of question strategies 514. For example, the simulator 508 can be a simulator that answers one or more questions associated with the set of question strategies 514 to estimate performance of the dialogue strategy system 502 and/or an information system associated with the dialogue strategy system 502. In certain embodiments, the simulator 508 can answer one or more questions associated with the set of question strategies 514 based on one or more machine learning techniques and/or one or more artificial intelligence techniques. The information gain calculator 506 can calculate information gain data based on the item-features matrix 510, the NLU accuracy 512, the set of question strategies 514 and/or the interaction cost 516. For example, the information gain calculator 506 can calculate an amount of change in entropy associated with the set of question strategies 514. The question strategy 518 can be a series of one or more questions that can be provided by the dialogue strategy system 502 to a user (e.g., an electronic device employed by a user). For example, the question strategy 518 can be an optimal series of one or more questions that can be provided by the dialogue strategy system 502 to a user (e.g., an electronic device employed by a user).

Figure 6:
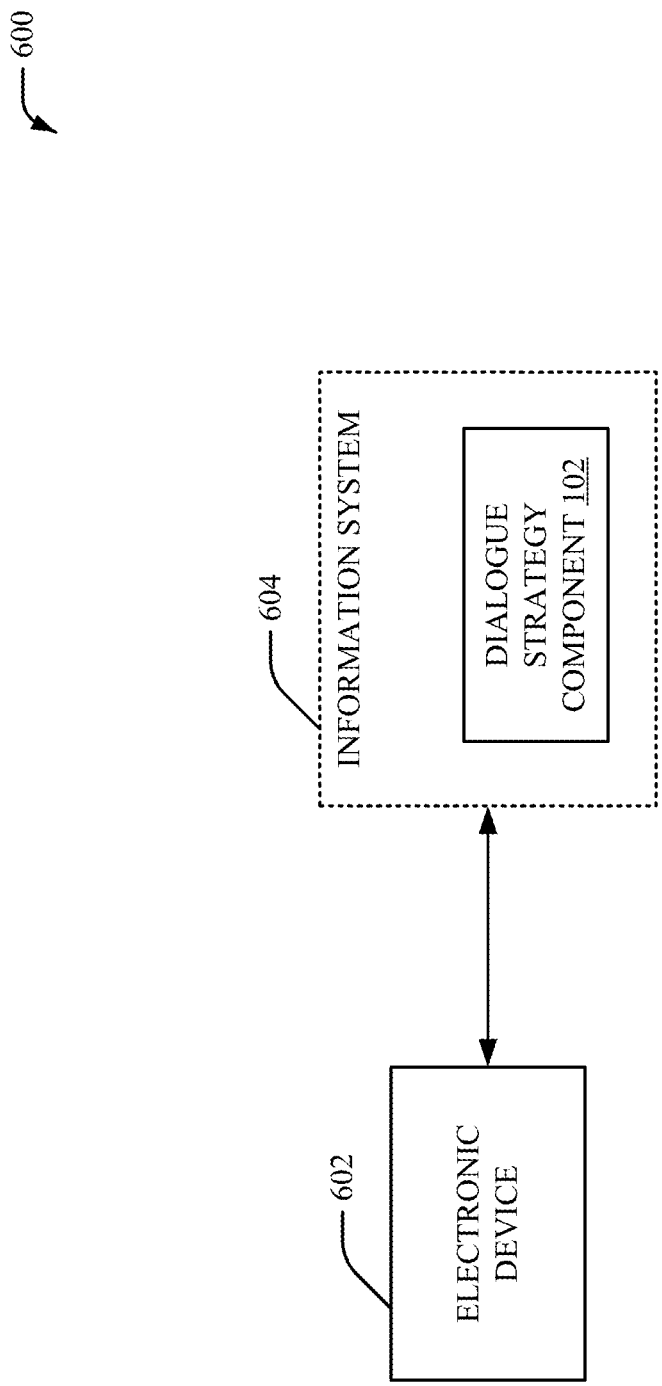
FIG. 6 illustrates an example, non-limiting system associated with an electronic device and an information system in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes an electronic device 602 and an information system 604. The electronic device 602 can be a user device such as, for example, a computing device, a computer, a desktop computer, a laptop computer, a monitor device, a smart device, a smart phone, a mobile device, a handheld device, a tablet, a wearable device, a portable computing device, a sensor device, a microphone device, and/or or another electronic device. Furthermore, the electronic device 602 can provide dialogue data (e.g., the dialogue input data 112) to the information system 604. For example, the electronic device 602 can provide speech data, textual data, audio data, video data, image data and/or other data to the information system 604. Additionally or alternatively, the electronic device 602 can receive dialogue data (e.g., the dialogue output data 114) from the information system 604. For example, the electronic device 602 can receive speech data, textual data, audio data, video data, image data and/or other data from the information system 604. In an aspect, the information system 604 can include the dialogue strategy component 102. The information system 604 can be an information query system such as, for example, a dialogue computer system. For example, the information system 604 can be a computer program system that employs one or more artificial intelligence techniques in connection with the dialogue strategy component 102 to conduct a dialogue with a user associated with the electronic device 602 via speech data, textual data, audio data, video data, image data and/or other data. In certain embodiments, the information system 604 can be implemented on a server and/or a cloud-computing environment. For example, the electronic device 602 can be in communication with the information system 604 via a network such as, for example, a wireless network, a wired network, a communication network, a wide area network (WAN, e.g., the Internet), a LAN, an internet protocol (IP) network, a voice over IP network, an internet telephony network, a cellular network, a mobile telecommunications network and/or another type of network.

Figure 7:
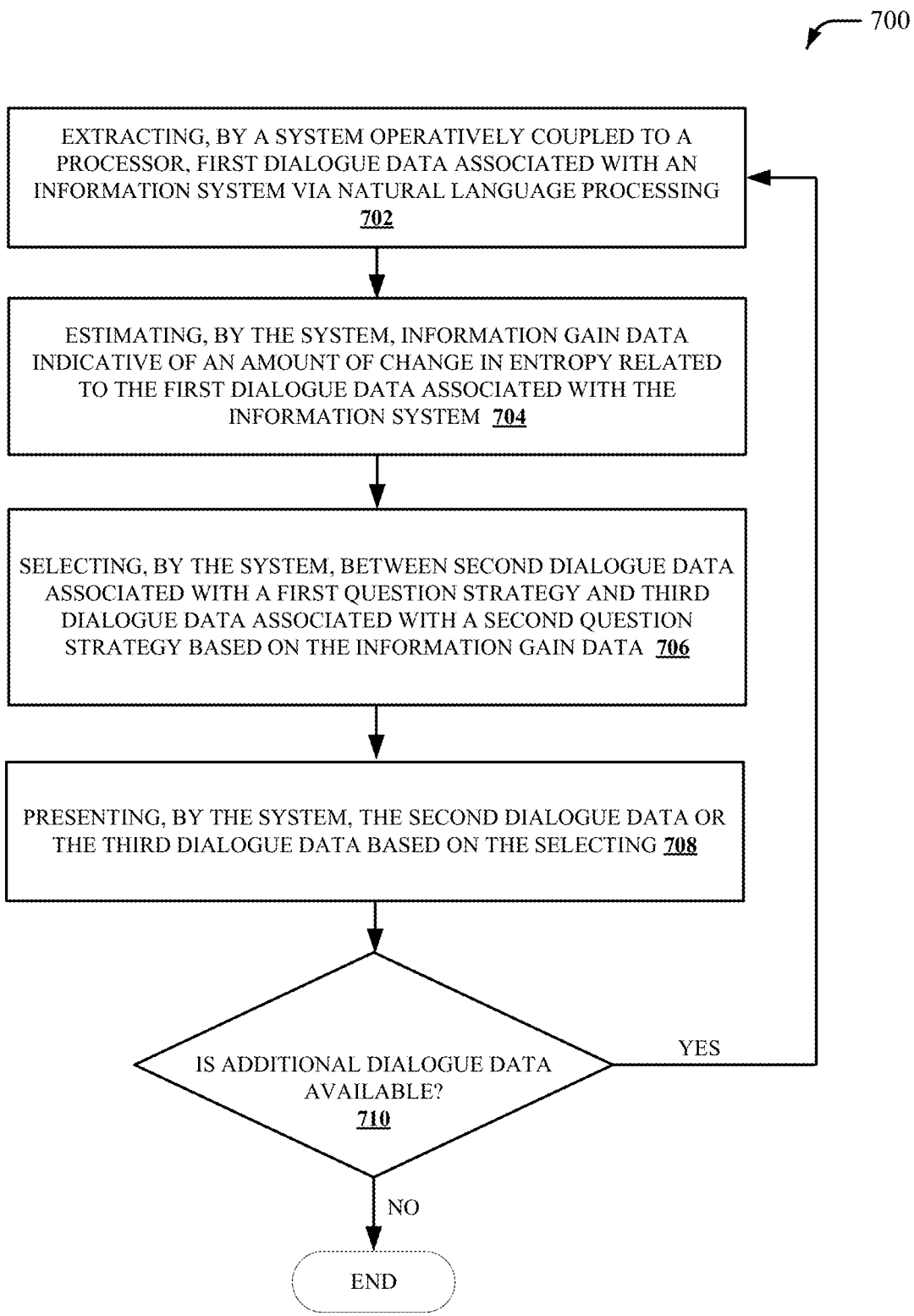
FIG. 7 illustrates a flow diagram of an example, non-limiting computer-implemented method for facilitating generating and executing an optimal dialogue strategy in accordance with one or more embodiments described herein.

FIG. 7 illustrates a flow diagram of an example, non-limiting computer-implemented method 700 that facilitates generating and executing an optimal dialogue strategy in accordance with one or more embodiments described herein. At 702, first dialogue data associated with an information system is extracted, by a system operatively coupled to a processor (e.g., by natural language processing component 202), via natural language processing. For instance, the first dialogue data can be extracted from the information system and/or an electronic device via natural language processing.

In one example, the electronic device can provide the first dialogue data to the information system. Furthermore, the first dialogue data can be processed and/or analyzed via one or more natural language processing techniques. For example, the one or more natural language processing techniques can include speech recognition and/or natural language understanding to interpret content of the first dialogue data. The first dialogue data can include speech data, audio data, textual data, video data, image data and/or other data. The electronic device can be a user device such as, for example, a computing device, a computer, a desktop computer, a laptop computer, a monitor device, a smart device, a smart phone, a mobile device, a handheld device, a tablet, a wearable device, a portable computing device, a sensor device, a microphone device, and/or or another electronic device. In certain embodiments, classifications, correlations, inferences and/or expressions associated with the first dialogue data can be determined based on principles of artificial intelligence and/or one or more machine learning techniques.

At 704, information gain data indicative of an amount of change in entropy related to the first dialogue data associated with the information system is estimated, by the system (e.g., by information gain component 104). In an embodiment, the information gain data can be scaled based on accuracy of natural language processing associated with the first dialogue data. For example, the information gain data can be scaled based on estimated accuracy of detected dialogue associated with the first dialogue data using natural language processing.

At 706, second dialogue data associated with a first question strategy or third dialogue data associated with a second question strategy is selected, by the system (e.g., by question selector component 106), based on the information gain data. The first question strategy can be a first query strategy for a first dialogue provided by the information system. Furthermore, the first question strategy can include first speech data, first textual data, first audio data, first video data, first image data and/or other first data. The second question strategy can be a second query strategy for a second dialogue provided by the information system. Furthermore, the second question strategy can include second speech data, second textual data, second audio data, second video data, second image data and/or other second data.

At 708, the second dialogue data or the third dialogue data is presented, by the system (e.g., by question selector component 106). For example, speech data, textual data, audio data, video data, image data and/or other data associated with the second dialogue data or the third dialogue data can be presented on an electronic device. The electronic device can correspond to an electronic device that provides the first dialogue data. Alternatively, the electronic device can be a different electronic device than an electronic device that provides the first dialogue data.

At 710, it is determined whether additional dialogue data is available. If yes, the computer-implemented method 700 can return to 702. If no, the computer-implemented method 700 can end. In certain embodiments, the computer-implemented method 700 can additionally or alternatively include generating, by the system, accuracy data that estimates accuracy of the natural language processing. In certain embodiments, the computer-implemented method 700 can additionally or alternatively include modifying, by the system, the information gain data based on the accuracy data. In certain embodiments, the computer-implemented method 700 can additionally or alternatively include improving performance for the information system by selecting the second dialogue data or the third dialogue data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least extracting dialogue data via natural language processing and/or presenting dialogue data is established from a combination of electrical and mechanical components and circuitry, a human is unable to replicate or perform processing performed, for example, by the dialogue strategy component 102 (e.g., the information gain component 104, the question selector component 106, the natural language processing component 202, the simulation component 302 and/or the artificial intelligence component 402) disclosed herein. For example, a human is unable to perform natural language processing, present dialogue data on an electronic device, etc.

Figure 8:
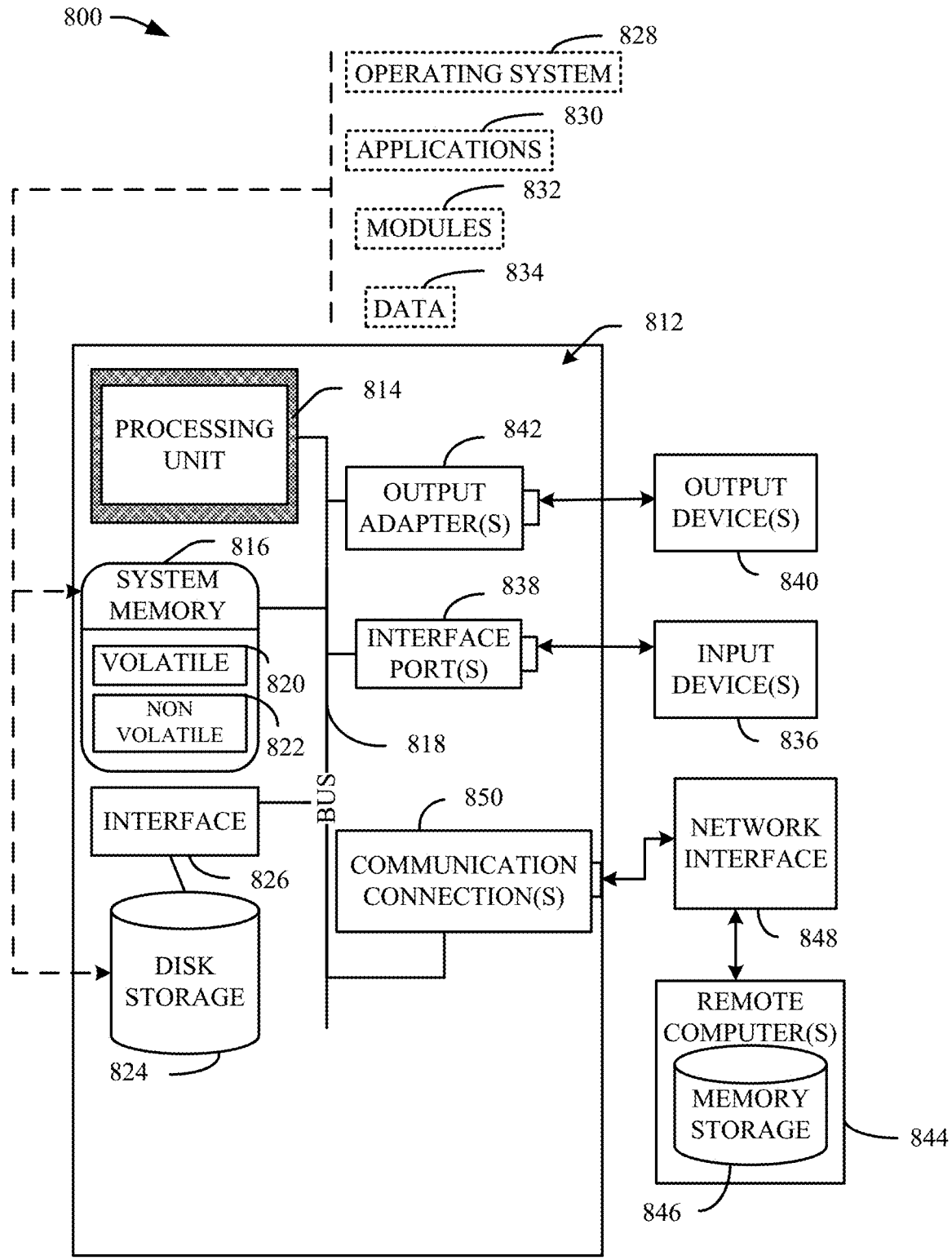
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/ output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
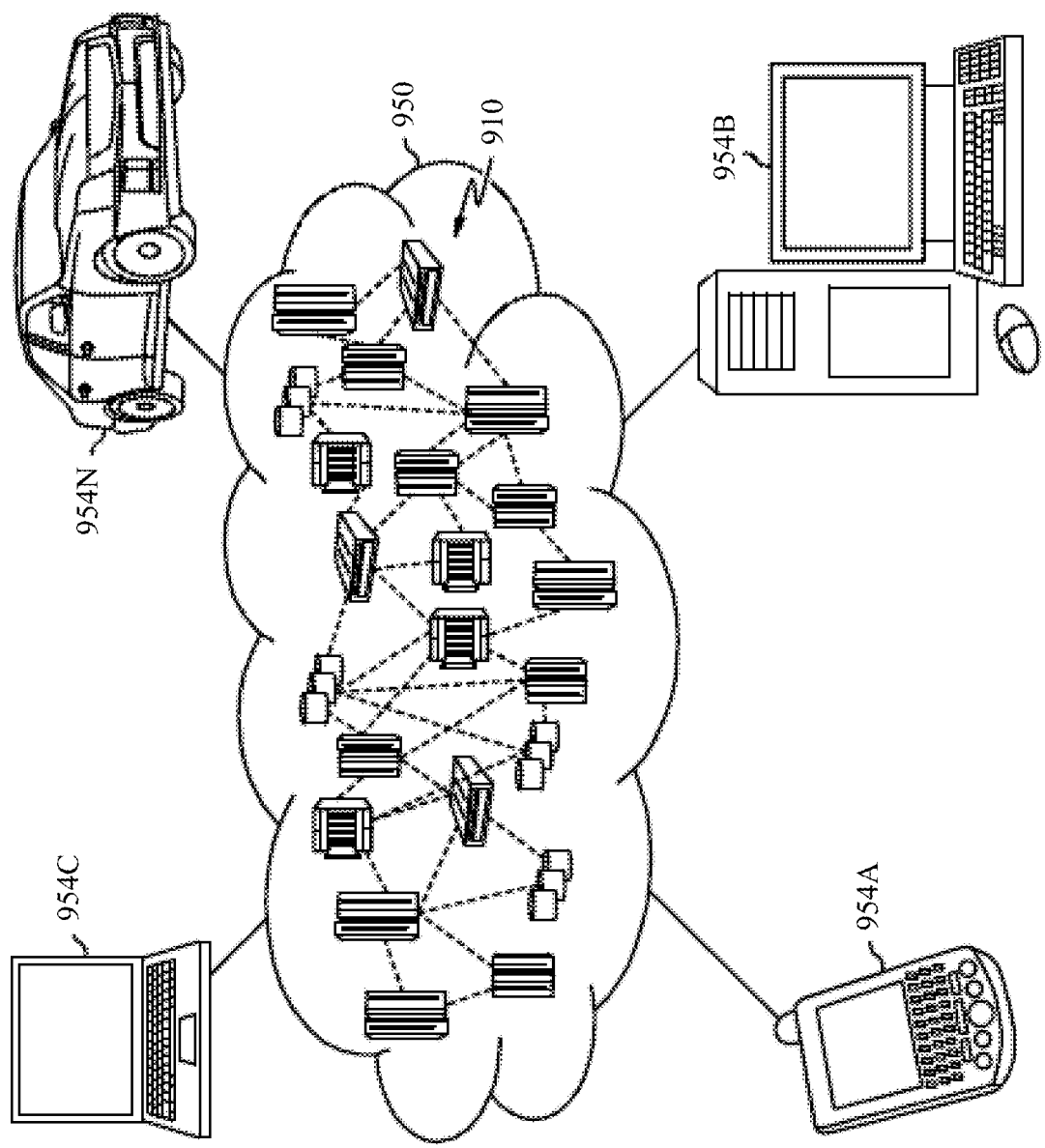
FIG. 9 illustrates a block diagram of an example, non-limiting cloud computing environment in accordance with one or more embodiments of the present invention.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
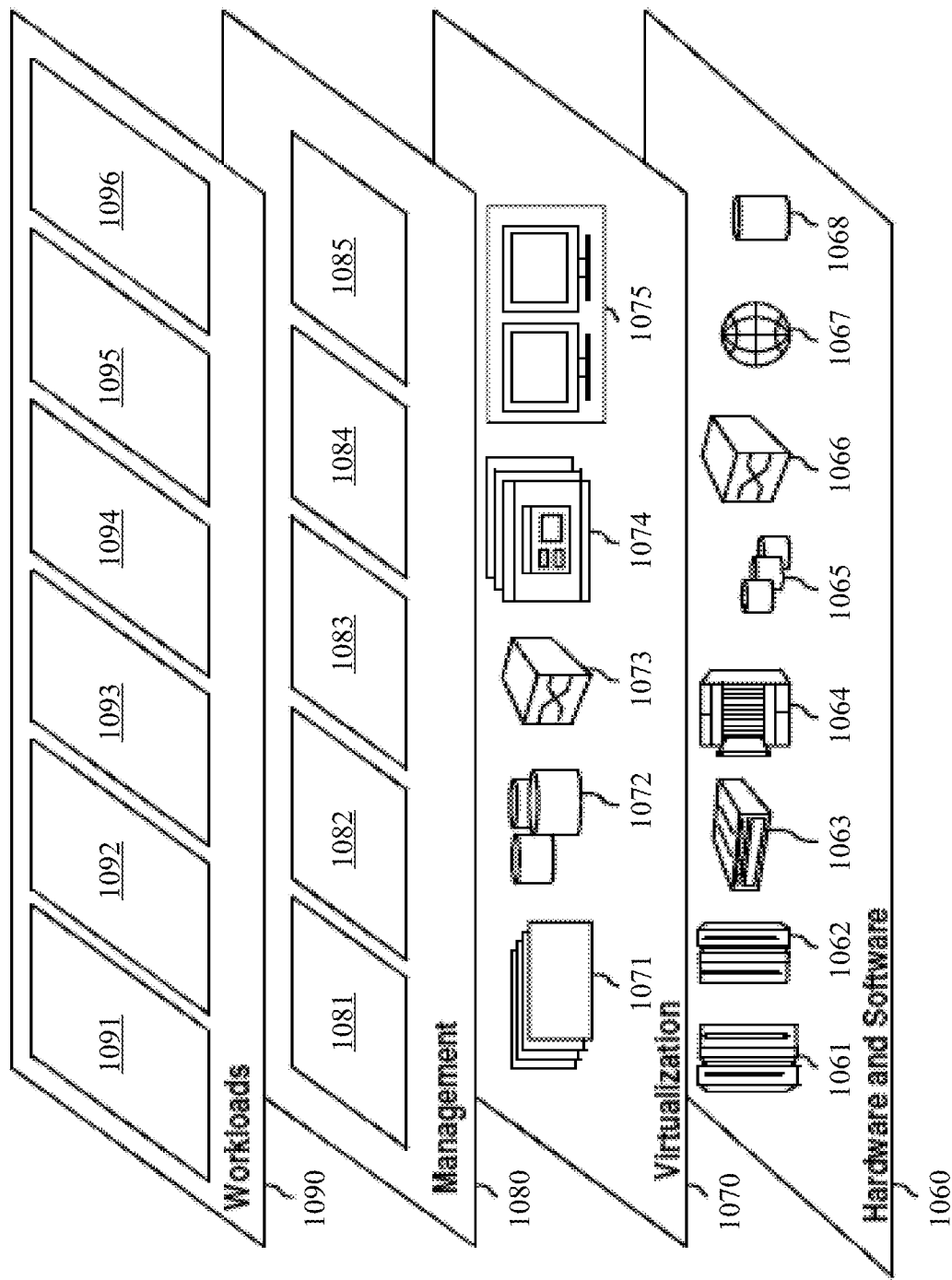
FIG. 10 illustrates a block diagram of example, non-limiting abstraction model layers in accordance with one or more embodiments of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and dialogue strategy process software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor that executes the computer executable components stored in the memory, wherein the computer executable components comprise:
        a dialog strategy component that iteratively performs, while a user is engaged in a dialog with an information system:
            trains a machine learning model to learn items and features associated with user dialogues for generating and selecting questions to present to the user, the training comprising:
                obtains, by the machine learning model, dialogue input data from the user;
                generates, by the machine learning model, an open-ended question and a closed-ended question based on the dialogue input data; and
                selects, by the machine learning model, dialogue one of the open-ended question or the closed-ended question that produces a highest amount of change of entropy associated with information gain for presentation by the information system in response to the dialogue input data.

2. The system of claim 1, wherein the closed-ended question is associated with a binary response and the open-ended question is associated with a non-binary response.

3. The system of claim 1, wherein the computer executable components further comprise:
    a natural language processing component that extracts the dialogue input data from the information system via natural language processing.

4. The system of claim 3, wherein the natural language processing component generates accuracy data that estimates accuracy of the natural language processing.

5. The system of claim 4, wherein the dialog strategy component determines at least one of a first amount of change in entropy associated with employing the open-ended question or a second amount of change in the entropy associated with employing the closed-ended question based on the accuracy data.

6. The system of claim 1, wherein the dialog strategy component determines at least one of a first amount of change in entropy associated with employing the open-ended question or a second amount of change in the entropy associated with employing the closed-ended question based on features associated with the dialogue input data.

7. The system of claim 1, wherein the machine learning model generates at least one of the open-ended question or the closed-ended question based further on a matrix associated with the items and features.

8. A computer-implemented method, comprising:
    iteratively performing, by a system operatively coupled to a processor, while a user is engaged in a dialog with an information system:
        training a machine learning model to learn items and features associated with user dialogues for generating and selecting questions to present to the user, the training comprising:
            obtaining, by the machine learning model, dialogue input data from the user;
            generating, by the machine learning model, an open-ended question and a closed-ended question based on the dialogue input data; and
            selecting, by the machine learning model, one of the open-ended question or the closed-ended question that produces a highest amount of change of entropy associated with information gain for presentation by the information system in response to the dialogue input data.

9. The computer-implemented method of claim 8, wherein the closed-ended question is associated with a binary response and the open-ended question is associated with a non-binary response.

10. The computer-implemented method of claim 8, further comprising:
    extracting, by the system, the dialogue input data from the information system via natural language processing.

11. The computer-implemented method of claim 10, further comprising:
    generating, by the system, accuracy data that estimates accuracy of the natural language processing.

12. The computer-implemented method of claim 11, further comprising: determining, by the system, at least one of a first amount of change in entropy associated with employing the open-ended question or a second amount of change in the entropy associated with employing the closed-ended question based on the accuracy data.

13. The computer-implemented method of claim 8, further comprising: determining, by the system, at least one of a first amount of change in entropy associated with employing the open-ended question or a second amount of change in the entropy associated with employing the closed-ended question based on features associated with the dialogue input data.

14. The computer-implemented method of claim 8, wherein the machine learning model generates at least one of the open-ended question or the closed-ended question based further on a matrix associated with the items and features.

15. A computer program product facilitating generating and executing an optimal dialogue strategy, the computer program product comprising a computer readable storage medium having program instructions embodied therewith, the program instructions executable by a processor to cause the processor to:

iteratively performing, while a user is engaged in a dialog with an information system:

train a machine learning model to learn items and features associated with user dialogues for generating and selecting questions to present to the user, the training comprising:

obtain, by the machine learning model, dialogue input data from the user;

generate, by the machine learning model, an open-ended question and a closed-ended question based on the dialogue input data; and select, by the machine learning model, one of the open-ended question or the closed-ended question that produces a highest amount of change of entropy associated with information gain for presentation by the information system in response to the dialogue input data.

16. The computer program product of claim 15, wherein the closed-ended question is associated with a binary response and the open-ended question is associated with a non-binary response.

17. The computer program product of claim 15, wherein the program instructions are further executable by the processor to cause the processor to:

extract, by the processor, the dialogue input data from the information system via natural language processing.

18. The computer program product of claim 17, wherein the program instructions are further executable by the processor to cause the processor to:

generate, by the processor, accuracy data that estimates accuracy of the natural language processing.

19. The computer program product of claim 18, wherein the program instructions are further executable by the processor to cause the processor to:

determine, by the processor, at least one of a first amount of change in entropy associated with employing the open-ended question or a second amount of change in the entropy associated with employing the closed-ended question based on the accuracy data.

20. The computer program product of claim 15, wherein the program instructions are further executable by the processor to cause the processor to:

determine, by the processor, at least one of a first amount of change in entropy associated with employing the open-ended question or a second amount of change in the entropy associated with employing the closed-ended question based on features associated with the dialogue input data.

* * * * *